United States Patent
Spitzer et al.

(12) 
(10) Patent No.: US 6,724,354 B1
(45) Date of Patent: Apr. 20, 2004

(54) ILLUMINATION SYSTEMS FOR EYEGLASS AND FACEMASK DISPLAY SYSTEMS

(75) Inventors: Mark B. Spitzer, Sharon, MA (US); John O. Crawford, Hopkinton, MA (US)

(73) Assignee: The Microoptical Corporation, Westwood, MA (US)

( * ) Notice: Subject to any disclaimer, the term of this patent is extended or adjusted under 35 U.S.C. 154(b) by 0 days.

(21) Appl. No.: 09/580,138

(22) Filed: May 30, 2000

Related U.S. Application Data

(60) Provisional application No. 60/140,327, filed on Jun. 21, 1999.

(51) Int. Cl.$^7$ .................................................. G09G 3/00
(52) U.S. Cl. ................................ 345/32; 345/8; 345/102
(58) Field of Search ............................... 345/8, 9, 102, 345/7, 87, 88, 89, 90–99, 100, 101, 103, 104, 32; 348/51, 52, 53, 54, 55, 56, 57, 58, 59, 60; 349/11, 61, 62, 63; 359/385

(56) References Cited

U.S. PATENT DOCUMENTS

| | | | |
|---|---|---|---|
| 2,339,173 A | 1/1944 | Koren | 179/107 |
| D195,365 S | 6/1963 | Holt | D57/1 |
| 3,192,826 A | 7/1965 | Papke | 88/1.5 |

(List continued on next page.)

FOREIGN PATENT DOCUMENTS

| | | | |
|---|---|---|---|
| DE | 22 05 325 C2 | 4/1973 | 356/251 |
| DE | 36 23 206 A1 | 1/1988 | |
| DE | 44 36 528 A | 4/1996 | |
| EP | 0 344 881 A2 | 12/1989 | |
| EP | 0 535 402 A1 | 4/1993 | |
| EP | 0 825 470 A | 2/1998 | |
| EP | 0 871 054 A2 | 10/1998 | |
| GB | 301672 | 12/1928 | 350/286 |
| WO | WO 95 11473 A | 4/1995 | |
| WO | WO 98/15868 | 4/1998 | |
| WO | WO 99/23524 | 5/1999 | |
| WO | WO 99/23525 | 5/1999 | |

OTHER PUBLICATIONS

Microsoft Computer Dictionary, 4th ed., Microsoft Press, 1999, p. 324.*

*Eyeglass Heads–Up Display*, Hubert W. Upton et al., Int'l. Symposium of the Soc. For Information Display, Apr. 28–30, 1981, New York, pp. 48–49.

(List continued on next page.)

*Primary Examiner*—Steven Saras
*Assistant Examiner*—Leland R. Jorgensen
(74) *Attorney, Agent, or Firm*—Weingarten, Schurgin, Gagnebin & Lebovici LLP

(57) ABSTRACT

A display illumination and viewing system has an illumination optical path and a viewing optical path coinciding along a portion of their lengths. A display is located at one end of the coinciding path portion. A first lens system is located on the coinciding path portion and a second lens system is located on the viewing optical path. An illumination assembly is located on the illumination optical path and off the coinciding path portion. The illumination assembly is spaced from the first lens system by a distance corresponding to a focal length of the first lens system. A reflective and transmissive element is located at an opposite end of the coinciding path portion to reflect light from the illumination assembly onto the coinciding path portion toward the display and to transmit light from the display along the viewing optical path. In another aspect of the invention, the image display system is operable in a color mode and a monochrome mode. Illumination circuitry is in communication with an illumination source and includes a switch operative to switch the illumination source between the color mode to provide a color display and the monochrome mode to provide a monochrome display.

11 Claims, 7 Drawing Sheets

U.S. PATENT DOCUMENTS

| | | | |
|---|---|---|---|
| 3,216,308 A | 11/1965 | Northcutt | 88/1 |
| 3,229,580 A | 1/1966 | Mitchell | 88/86 |
| 3,524,710 A | 1/1967 | Rickert | 356/251 |
| 3,610,825 A | 10/1971 | Fritzel | 178/7.8 |
| 3,744,049 A * | 7/1973 | Luce | 345/52 |
| 3,787,109 A | 1/1974 | Vizenor | 350/302 |
| 3,885,095 A | 5/1975 | Wolfson et al. | 178/7.88 |
| 3,915,548 A | 10/1975 | Opittek et al. | 350/3.5 |
| 3,923,370 A | 12/1975 | Mostrom | 350/55 |
| 3,936,605 A | 2/1976 | Upton | 179/1 SP |
| 3,940,204 A | 2/1976 | Withrington | 350/3.5 |
| RE28,847 E | 6/1976 | Vizenor | 350/302 |
| 4,052,073 A | 10/1977 | Miller | 273/148 R |
| 4,082,432 A | 4/1978 | Kirschner | 350/174 |
| 4,195,915 A | 4/1980 | Lichty et al. | 350/345 |
| 4,218,111 A | 8/1980 | Withrington | 350/3.72 |
| 4,447,128 A | 5/1984 | Ferrer | 350/174 |
| 4,550,984 A | 11/1985 | Reymond | 350/404 |
| 4,621,283 A | 11/1986 | Feinbloom | 358/93 |
| 4,649,434 A | 3/1987 | Weinblatt | 358/250 |
| 4,664,475 A | 5/1987 | Ferrer | 350/174 |
| 4,665,385 A | 5/1987 | Henderson | 340/539 |
| 4,722,601 A | 2/1988 | McFarlane | 356/152 |
| 4,751,691 A | 6/1988 | Perera | 368/10 |
| 4,753,514 A | 6/1988 | Kubik | 350/174 |
| 4,799,765 A | 1/1989 | Ferrer | 350/174 |
| 4,806,001 A | 2/1989 | Okabe et al. | 350/432 |
| 4,806,011 A | 2/1989 | Bettinger | 351/158 |
| 4,818,048 A | 4/1989 | Moss | 350/3.7 |
| 4,826,287 A | 5/1989 | Cook et al. | 350/174 |
| 4,852,988 A | 8/1989 | Velez et al. | 351/210 |
| 4,853,306 A | 8/1989 | Wreede et al. | 430/1 |
| 4,867,551 A | 9/1989 | Perera | 351/158 |
| 4,869,575 A | 9/1989 | Kubik | 350/174 |
| 4,877,309 A * | 10/1989 | Takamatsu | 349/80 |
| 4,884,137 A | 11/1989 | Hanson et al. | 358/108 |
| 4,902,083 A | 2/1990 | Wells | 350/6.6 |
| 4,934,773 A | 6/1990 | Becker | 350/6.6 |
| 4,953,953 A * | 9/1990 | Fergason | 349/79 |
| 4,961,626 A | 10/1990 | Fournier et al. | 350/174 |
| 4,966,441 A * | 10/1990 | Connor | 349/80 |
| 4,968,117 A | 11/1990 | Chern et al. | 350/162.24 |
| 4,973,132 A | 11/1990 | McDonald et al. | 350/174 |
| 4,973,139 A | 11/1990 | Weinhrauch et al. | 350/345 |
| 4,988,183 A | 1/1991 | Kasahara et al. | 351/210 |
| 5,003,300 A | 3/1991 | Wells | 340/705 |
| 5,013,134 A | 5/1991 | Smith | 350/174 |
| 5,028,119 A | 7/1991 | Hegg et al. | 350/174 |
| 5,044,709 A | 9/1991 | Smith et al. | 359/13 |
| 5,050,962 A | 9/1991 | Monnier et al. | 359/13 |
| 5,053,755 A | 10/1991 | Smith et al. | 340/705 |
| 5,106,179 A | 4/1992 | Kamaya et al. | 351/158 |
| 5,128,783 A * | 7/1992 | Abileah et al. | 349/162 |
| 5,129,716 A | 7/1992 | Holakovszky et al. | 351/50 |
| 5,138,470 A | 8/1992 | Moss et al. | 359/13 |
| 5,162,828 A | 11/1992 | Furness et al. | 353/122 |
| 5,184,250 A | 2/1993 | Lacroix | 359/631 |
| 5,212,471 A | 5/1993 | McDonald | 340/705 |
| 5,214,425 A | 5/1993 | Wreede | 340/980 |
| 5,231,379 A | 7/1993 | Wood et al. | 340/705 |
| 5,281,957 A | 1/1994 | Schoolman | 345/8 |
| 5,281,960 A | 1/1994 | Dwyer, III | 345/31 |
| 5,309,169 A | 5/1994 | Lippert | 345/8 |
| 5,320,538 A | 6/1994 | Baum | 434/307 |
| 5,325,386 A | 6/1994 | Jewell et al. | 372/50 |
| 5,334,991 A | 8/1994 | Wells et al. | 345/8 |
| 5,348,477 A | 9/1994 | Welch et al. | 434/43 |
| 5,359,669 A | 10/1994 | Shanley et al. | 382/6 |
| 5,367,345 A | 11/1994 | DaSilva | 351/123 |
| 5,369,415 A | 11/1994 | Richard et al. | 345/6 |
| 5,381,267 A | 1/1995 | Woody | 359/632 |
| 5,384,654 A | 1/1995 | Iba | 359/364 |
| 5,392,158 A | 2/1995 | Tosaki | 359/633 |
| 5,416,876 A | 5/1995 | Ansley et al. | 385/116 |
| 5,446,507 A | 8/1995 | Chang | 351/158 |
| 5,455,591 A | 10/1995 | Hui | 342/185 |
| 5,459,612 A | 10/1995 | Ingleton | 359/630 |
| 5,467,205 A * | 11/1995 | Kuba et al. | 349/5 |
| 5,469,185 A | 11/1995 | Lebby et al. | 345/8 |
| 5,491,510 A | 2/1996 | Gove | 348/77 |
| 5,495,576 A | 2/1996 | Ritchey | 395/125 |
| 5,506,728 A | 4/1996 | Edwards et al. | 359/629 |
| 5,519,410 A | 5/1996 | Smalanskas et al. | 345/7 |
| 5,519,533 A * | 5/1996 | Nomura et al. | 359/478 |
| 5,537,253 A | 7/1996 | Cox et al. | 359/630 |
| 5,539,578 A | 7/1996 | Togino et al. | 359/630 |
| 5,548,832 A * | 8/1996 | Karam | 455/226.4 |
| 5,576,887 A | 11/1996 | Ferrin et al. | 359/631 |
| 5,579,148 A | 11/1996 | Nishikawa et al. | 359/214 |
| 5,583,590 A | 12/1996 | Clupper | 351/200 |
| 5,585,871 A | 12/1996 | Linden | 351/158 |
| 5,589,846 A | 12/1996 | Kobayashi | 345/8 |
| 5,596,339 A * | 1/1997 | Furness, III et al. | 345/8 |
| 5,596,433 A | 1/1997 | Konuma | 359/631 |
| 5,596,451 A * | 1/1997 | Handschy et al. | 359/633 |
| 5,606,743 A | 2/1997 | Vogt et al. | 455/347 |
| 5,610,765 A | 3/1997 | Colucci | 359/633 |
| 5,612,708 A * | 3/1997 | Ansley et al. | 345/8 |
| 5,626,410 A | 5/1997 | Chambers et al. | 353/94 |
| 5,629,790 A | 5/1997 | Neukermans et al. | 359/198 |
| 5,644,323 A * | 7/1997 | Hildebrand et al. | 345/8 |
| 5,648,789 A | 7/1997 | Beadles et al. | 345/8 |
| 5,653,751 A | 8/1997 | Samiy et al. | 623/4 |
| 5,654,827 A | 8/1997 | Reichert | 359/631 |
| 5,654,828 A | 8/1997 | Togino et al. | 359/633 |
| 5,671,037 A | 9/1997 | Ogasawara et al. | 351/158 |
| 5,673,139 A | 9/1997 | Johnson | 359/291 |
| 5,682,173 A | 10/1997 | Holakovszky et al. | 345/8 |
| 5,699,194 A | 12/1997 | Takahashi | 359/633 |
| 5,701,202 A | 12/1997 | Takahashi | 359/631 |
| 5,712,649 A | 1/1998 | Tosaki | 345/8 |
| 5,717,479 A | 2/1998 | Rickards | 351/158 |
| 5,719,588 A | 2/1998 | Johnson | 345/8 |
| 5,726,671 A * | 3/1998 | Ansley et al. | 320/119 |
| 5,726,739 A * | 3/1998 | Hayata | 355/67 |
| 5,744,788 A | 4/1998 | Metlitsky et al. | 235/454 |
| 5,751,493 A | 5/1998 | Hur | 359/630 |
| 5,757,348 A * | 5/1998 | Handschy et al. | 345/89 |
| 5,760,858 A * | 6/1998 | Hodson et al. | 349/61 |
| 5,784,038 A * | 7/1998 | Irwin | 345/88 |
| 5,808,589 A * | 9/1998 | Fergason | 345/8 |
| 5,808,800 A * | 9/1998 | Handschy et al. | 359/630 |
| 5,815,326 A | 9/1998 | Takahashi | 359/729 |
| 5,841,492 A * | 11/1998 | Iwauchi et al. | 349/74 |
| 5,844,656 A | 12/1998 | Ronzani et al. | 351/158 |
| 5,844,824 A | 12/1998 | Newman et al. | 364/708.1 |
| 5,886,822 A | 3/1999 | Spitzer | 359/630 |
| 5,896,438 A * | 4/1999 | Miyake et al. | 378/34 |
| 5,900,976 A * | 5/1999 | Handschy et al. | 359/495 |
| 5,903,396 A * | 5/1999 | Rallison | 359/630 |
| 5,911,010 A * | 6/1999 | Nakajima | 382/239 |
| 5,943,171 A | 8/1999 | Budd et al. | 359/631 |
| 5,949,583 A | 9/1999 | Rallison et al. | 359/633 |
| 5,973,692 A * | 10/1999 | Knowlton et al. | 345/835 |
| 5,973,845 A | 10/1999 | Hildebrand et al. | 359/630 |
| 5,984,477 A * | 11/1999 | Weissman et al. | 353/28 |
| 5,991,103 A | 11/1999 | Togino | 359/834 |
| 6,005,536 A | 12/1999 | Beadles et al. | 345/7 |
| 6,005,720 A | 12/1999 | Watters et al. | 359/633 |
| 6,023,253 A * | 2/2000 | Taniguchi et al. | 345/7 |
| 6,023,372 A | 2/2000 | Spitzer et al. | 359/630 |

| | | | | |
|---|---|---|---|---|
| 6,078,363 A | * | 6/2000 | Masuda et al. | 349/48 |
| 6,081,304 A | * | 6/2000 | Kuriyama et al. | 348/838 |
| 6,091,546 A | | 7/2000 | Spitzer | 359/618 |
| 6,094,181 A | * | 7/2000 | Hildebrand et al. | 345/8 |
| 6,101,036 A | * | 8/2000 | Bloom | 359/567 |
| 6,140,983 A | * | 10/2000 | Quanrud | 345/55 |
| 6,144,439 A | | 11/2000 | Carollo | 349/176 |
| 6,215,532 B1 | * | 4/2001 | Takagi et al. | 349/11 |
| 6,246,383 B1 | * | 6/2001 | Ophey | 345/8 |
| 6,281,867 B2 | * | 8/2001 | Kurematsu et al. | 345/88 |
| 6,281,952 B1 | * | 8/2001 | Okamoto et al. | 349/12 |
| 6,292,158 B1 | | 9/2001 | Amafuji et al. | 345/7 |
| 6,304,234 B1 | | 10/2001 | Horiuchi | 345/8 |
| 6,320,559 B1 | * | 11/2001 | Yasukawa et al. | 345/7 |
| 6,417,970 B1 | | 7/2002 | Travers et al. | 359/630 |
| 6,447,122 B1 | * | 9/2002 | Kobayashi et al. | 353/97 |

OTHER PUBLICATIONS

*Sparcchair: A One Hundred Million Pixel Display*, B.A. Reichlen, Proceedings of the Virtual Reality Annual Int'l. Symposium–Seattle, Sep. 18–22, 1993, New York, IEEE, US vol. Symp. 1, pp. 300–307.

*Real–Time American Sign Language Recognition: Using Desk and Wearable Computer Based Video*, Thad Starner et al., Perpetual Computing TR#466, MIT Media Lab., to appear IEEE PAMI '98, submitted Apr. 26, 1996.

*WearCam (The Wearable Camera): Personal Imaging Systems for long–term use in wearable tetherless computer–mediated reality and personal Photo/Videographic Memory Prosthesis*, Steve Mann, Digest of Papers of the Second International Symposium on Wearable Computers, Oct. 19–20, 1998, Pittsburgh, PA, pp. 124–131, sponsored by IEEE Computer Society Task Force on Wearable Information Systems.

*Video I/O interface for wearable computers*, M.B. Spitzer et al., Proceedings of SPIE Conference 3689, Helmet and Head–Mounted Displays IV, Orlando, Florida, Apr. 5 and 6, 1999.

"The Wearable PC, Wired for wear: IBM researchers demonstrate a wearable ThinkPad Prototype", www.ibm.com/News/Is/1998/09/jp–3.phtml.

"Technical Prototype, See the specifications for IBM's new wearable PC Prototype", www.ibm.com/News/Is/1998/09/jp–4.phtm.

Albacomp Computers Corp., "Personal Monitor" brochure.

Ferrin, Frank J., "An update on optical systems for military head mounted displays", presented at SPIE's "AeroSense", Apr. 5–9, 1999, 8 pages.

Rotier, Donald J., "Optical Approaches to the Helmet–Mounted Display", SPIE vol. 1116 Helmet–Mounted Displays (1989), pp. 14–18.

Ditlea, Steve, "Inside Big Blue", *Popular Mechnics*, Dec. 1998, pp. 54–59.

"Mission Impossible: Video Glasses and Sunglasses, The Absolute Ultimate In Covert Video Surveillance", www.pimall.com/nais/e.vsunglass.html, Oct. 27, 1998, pp. 1–4.

* cited by examiner

ILLUMINATION SYSTEMS FOR EYEGLASS AND FACEMASK DISPLAY SYSTEMS

CROSS REFERENCE TO RELATED APPLICATIONS

This application claims the benefit under 35 U.S.C. §112 (e) of U.S. Provisional Application No. 60/140,327, filed Jun. 21, 1999, the entire disclosure of which is incorporated herein by reference.

STATEMENT REGARDING FEDERALLY SPONSORED RESEARCH OR DEVELOPMENT

The development of this invention was supported by R&D Contract DAAN02-98-C-4026. The U.S. government may have certain rights in this invention.

BACKGROUND OF THE INVENTION

Miniature active matrix liquid crystal displays (AMLCD) require an illumination source. In systems using transmissive AMLCDs, a light source is placed behind the display. FIG. 1 shows a simple prior art approach in which a transmissive AMLCD 10 is provided with an light emitting diode (LED) backlight 20. Rays from the backlight 30 propagate through the AMLCD and are modulated to produce an image. In some AMLCDs, color is obtained by sequentially loading red, green, and blue subframes into the AMLCD, and by simultaneously sequentially illuminating red, green, and blue LEDs. Sequential illumination is accomplished by providing current sequentially through one of the desired LED leads 40. A beam shaping element 50, such as a Fresnel lens, may be used to collimate the light. Other elements, such as diffusers or filters, may also be employed. AMLCDs and illuminators of this type are available commercially from Kopin Corporation. The viewing system for such displays may comprise simple optical magnifier optics, or a multi-stage optical system characterized by intermediate image planes between the stages.

Prior art miniature reflective AMLCDs (FIG. 2) use an illuminating system that is based on a beam splitter cube 70 adjacent to the display 60. The beam splitter may comprise a polarization splitting coating 71 which serves to linearly polarize the illuminating light, and which also acts as the analyzer for the LCD. The polarizing beam splitter may alternatively be formed from polymer films. As with the transmissive AMLCD, optical elements 50 may be used to collimate, diffuse or filter the illumination.

FIG. 3 shows a more complex prior art reflective AMLCD system that includes a compact, simple magnifier added to the illuminator system for viewing a magnified image of the display 60 (U.S. Pat, No. 5,596,451). In this prior art device, a compact system is formed by using a single beam splitter 71 for illuminating and viewing the image from the AMLCD 60. Although the beam splitter 71 is used for illumination and for viewing, mirror 42, which provides the magnification, is not employed in the illumination system optical path. A lens or mirror to affect vergence of the illumination light is not needed because the light source 34 in this design is a broad area emitter.

For the case of reflective AMCLDs, projection systems have been described that employ efficient illuminators, based on lamps and collimating optics. Collimating optics provide efficient, uniform illumination of the reflective display (see, for example, U.S. Pat. No. 6,036,318). Collimation systems of this type are not employed in head-mounted displays owing to high weight and volume that results from the additional lenses and path length needed.

Collimating illumination optics are generally used in projection systems that employ high intensity lamps and projection lens systems, such as disclosed in U.S. Pat. No. 5,949,503. In some cases, such as in the patent cited, a portion of the projection optics may be used for illumination. For projection systems, this approach leads to improved illumination uniformity and improved contrast in the projected image.

SUMMARY OF THE INVENTION

This invention relates to the attainment of an improved illuminating system for reflective liquid crystal displays. The improvement is based on integrating the illumination system with the magnifying system and thus using a single set of optical elements for the two purposes of magnifying the image and illuminating the display. The invention also relates to a system for obtaining high brightness monochrome images which may be applied to reflective or transmissive liquid crystal displays.

More particularly, the invention provides a display illumination and viewing system comprising an illumination optical path and a viewing optical path. At least a portion of the illumination optical path coincides with at least a portion of the viewing optical path to form a coinciding path portion. A display comprising an active matrix liquid crystal display is located at one end of the coinciding path portion. A first lens system is located on the coinciding path portion and provides an image plane on the viewing optical path. A second lens system is located on the viewing optical path.

An illumination assembly, such as red, green, and blue LEDs, is located on the illumination optical path and off the coinciding path portion. The illumination assembly is spaced from the first lens system by a distance corresponding to the focal length of the first lens system. A reflective and transmissive element, such as a beam splitter, is located at an opposite end of the coinciding path portion to reflect light from the illumination assembly onto the coinciding path portion toward the display and to transmit light from the display along the viewing optical path. In this manner, the present invention provides a collimating illumination system for a head-mounted reflective AMLCD, offering uniform and efficient illumination, with less weight and volume than prior art systems.

In another aspect of the invention, the image display system is operable in a color mode and a monochrome mode. The display system comprises an active matrix liquid crystal display operable at a determined frame rate comprising sequential loading of red, green, and blue subframes. An illumination source comprising red, green, and blue light sources, such as LEDs, is disposed to illuminate the active matrix liquid crystal display. Illumination circuitry is provided in communication with the illumination source and includes a switch operative to switch the illumination source between the color mode to provide a color display and the monochrome mode to provide a monochrome display. In this manner, the present invention obtains increased brightness by providing the ability to switch the illuminator to a monochrome mode. In a further aspect, the invention also provides for adjusting illuminator brightness.

DESCRIPTION OF THE DRAWINGS

The invention will be more fully understood from the following detailed description taken in conjunction with the accompanying drawings in which.

DESCRIPTION OF THE INVENTION

This invention comprises the integration of the viewing optics and the illumination optics in a single or multi-stage optical system. By integration we mean that some of the optical elements affecting vergence of rays that are used for the viewing optics also serve to collimate the light in the illumination system, thereby lowering cost, weight and volume.

Figure 2:
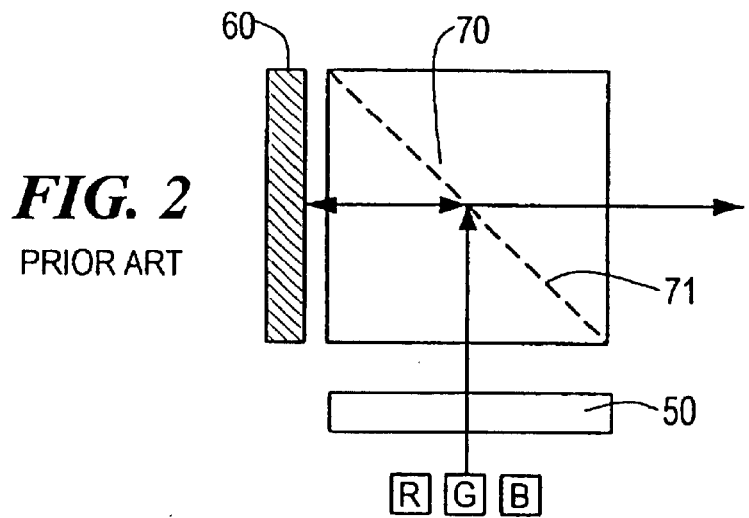
FIG. 2 is a schematic illustration of a prior art reflective active matrix liquid crystal display illumination system.
Figure 3:
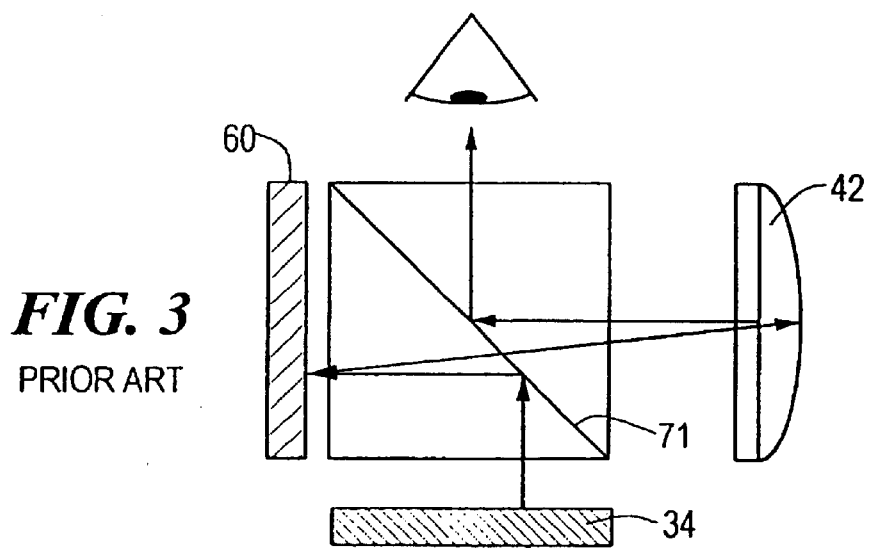
FIG. 3 is a schematic illustration of a prior art reflective active matrix liquid crystal display illumination system with magnifier.
Figure 4:
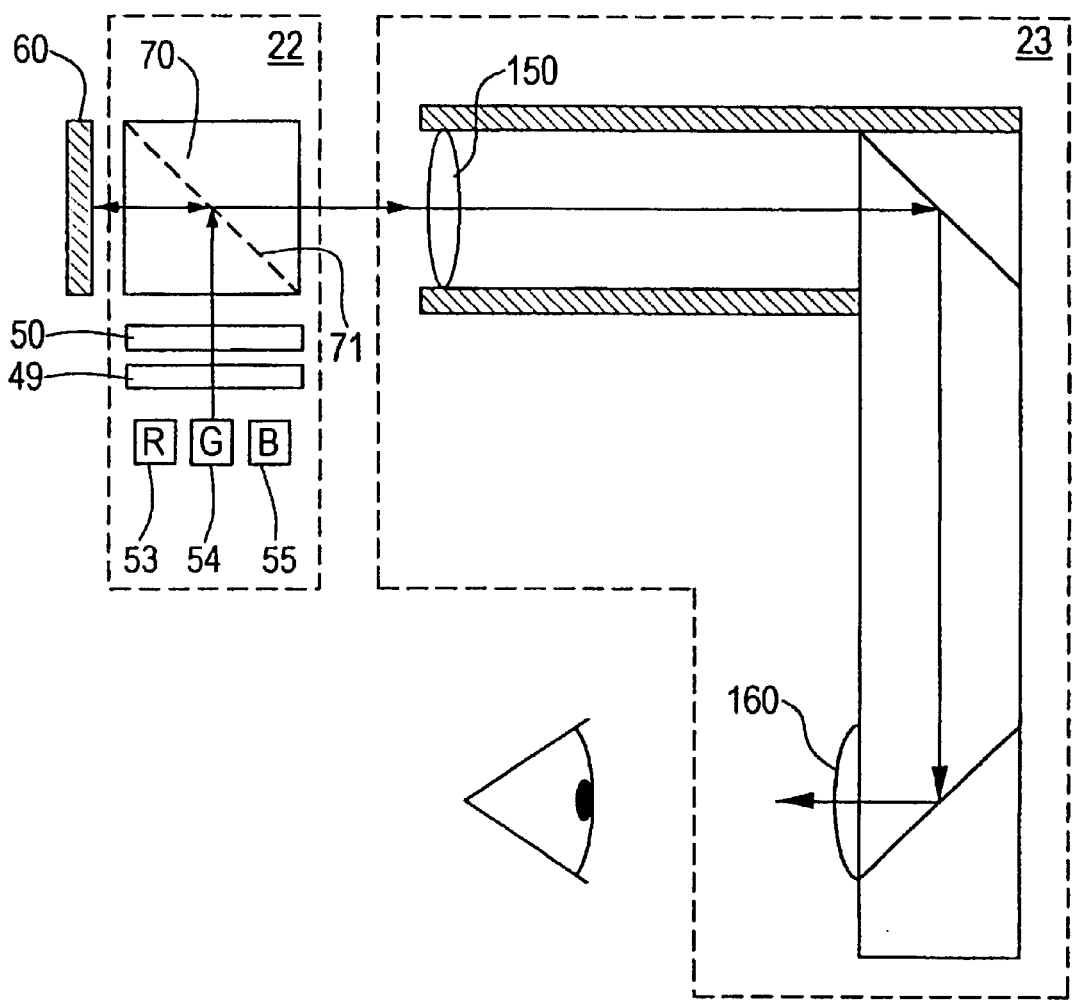
FIG. 4 is a display system incorporating an illumination system and a viewing system.

By way of preliminary explanation of the present invention, FIG. 4 illustrates a display system based on using the prior art collimation system shown in FIG. 2. An illumination system 22 is coupled with a viewing system 23 to provide an image to a viewer. The illumination system comprises red 53, green 54, and blue 55 LEDs, an optional diffuser 49, a Fresnel lens 50, and a polarization beam splitter 71. Illumination from the LEDs passes through the diffuser if employed, and is collimated by the Fresnel lens 50 to uniformly illuminate the AMLCD 60. Light of the reflected polarization is directed to the AMLCD by the beam splitter 71. The AMLCD rotates the polarization of the light at each of its pixels to an angle in accordance with electrical signals representing the image. Rays pass from the illumination stage 22 to the magnification stage 23, and are then viewed through the lenses 150 and 160. Any number of optical surfaces may be used to magnify the image and to correct aberrations; for simplicity we have represented the lens surfaces by the singlet lenses 150 and 160. In practice, these lenses 150, 160 may each be achromatic doublet or triplet lenses, aspheres, or more complex combinations of surfaces.

Figure 5A:
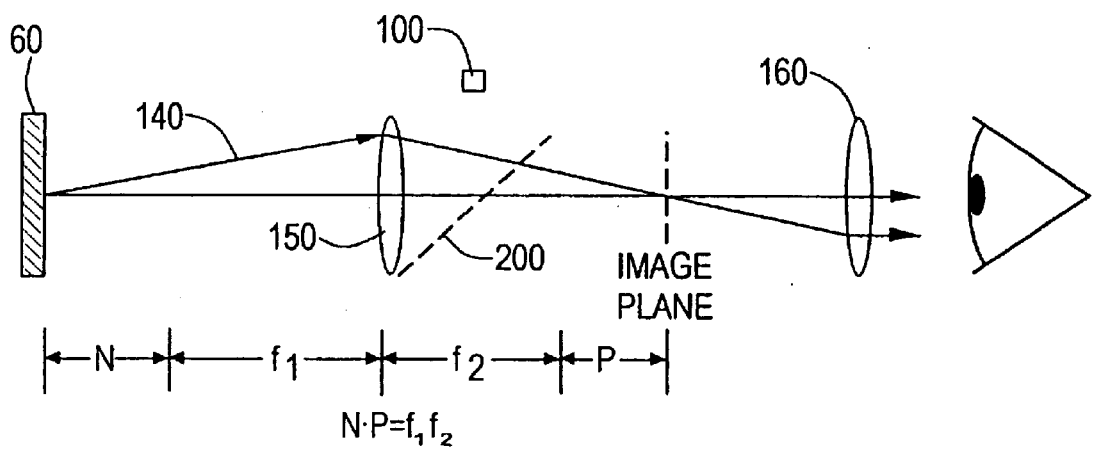
FIGS. 5a and 5b are schematic illustrations of the optical principals of a display system according to the present invention.
Figure 5B:
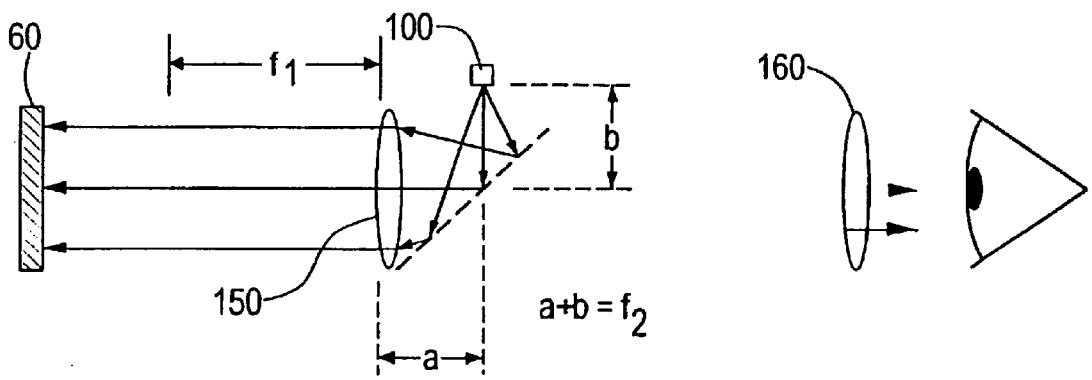

FIGS. 5a and 5b illustrate the optical principal of this invention. A reflective AMLCD 60 is viewed through a lens system that has two stages of magnification, represented by lens system 150 and lens system 160. A viewing path is defined from the AMLCD 60 through the lens system 150 and lens system 160 to a user's eye. Each lens system is characterized by a focal length, f. Referring to FIG. 5a, in accordance with Newton's lens equation (N·P=$f_1 \cdot f_2$), lens system 150 forms an intermediate image plane as shown between 150 and 160; the position of this plane is given by Newton's lens equation or its equivalents, which are well known in the art. If lens system 160 is placed at a distance from the image plane equal to its focal length, the user perceives an image at infinity. The position of lens 160 may be varied to change the distance of the virtual image. The magnification of the system is given by the product of the magnification of the two stages, as is well known in the art.

FIGS. 5a and 5b also show the insertion of a reflective and transmissive element, for example, a beam splitter 200 in between lens systems 150 and 160. The beam splitter may be a polarization beam splitter made by vacuum deposition of thin film multilayers as is known in the art, or made by polymer techniques (such products are offered by 3M for example), or it may be a vacuum-deposited thin metal film with approximately 50% transmission (a half silvered mirror). Alternatively, a polarization beam splitting cube may be used. Referring to FIG. 5b, it can be seen that the purpose of the beam splitter 200 is to reflect light from an illumination source, such as LED lamp 100, which may be a multi-color lamp comprising red, green and blue LEDs used in field sequential color illuminators, into the optical path. The path between the LED lamp 100 and the AMLCD 60 defines an illumination path. It can be seen that the illumination path coincides with a portion of the viewing path. If the LED is placed at a distance from lens system 150 equal to the focal length $f_2$ of lens system 150 (shown as the distance a+b in FIG. 5b), then 150 acts to collimate the light and thus improves the uniformity of the illumination on the AMLCD 60. Diffusers and other optical elements may be used between the LED and the beam splitter to homogenize the light incident on the AMLCD or to develop an extended light source in accordance with the viewing requirements of the complete system.

Figure 6:
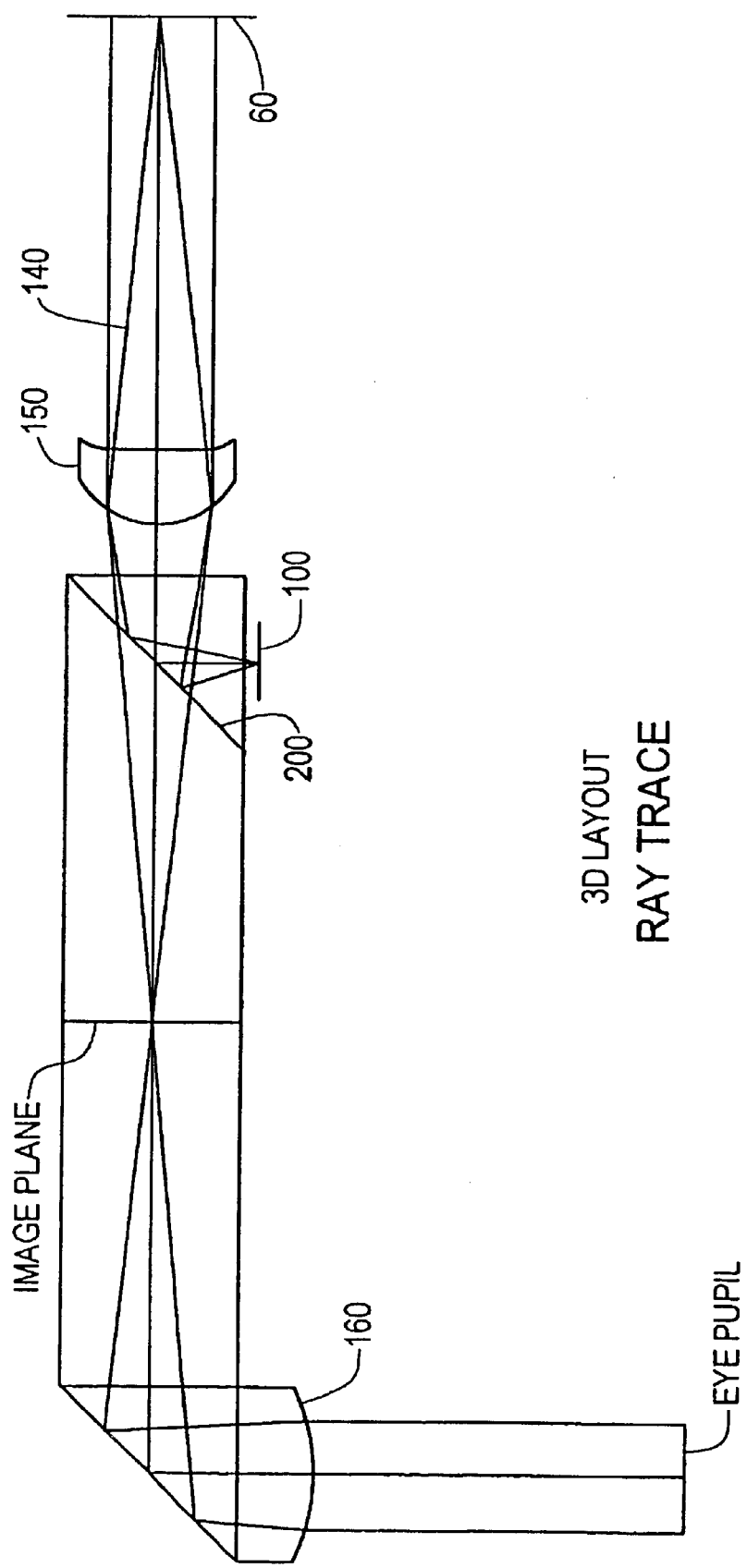
FIG. 6 is a schematic illustration of an optical design of the display system of FIGS. 5a and 5b.

FIG. 6 illustrates an example of an optical design based on this principal. The lens surfaces 150, 160 are aspheres known in the art and represented by the equation:

$$z := \frac{cr^2}{1 + \sqrt{1 - (1+k) \cdot c^2 \cdot r^2}} + \alpha_2 \cdot r^4 + \alpha_3 \cdot r^6 + \alpha_4 \cdot r^8$$

with coefficients as given in Table 1. Table 2 summarizes the optical prescription for the imaging path (between display 60 and the eye pupil), and Table 3 summarizes the prescription for the illumination path (between lamp 100 and the display 60).

TABLE 1

| Asphere Coefficients | |
|---|---|
| Coefficient | Value |
| κ | 0 |
| $\alpha_2$ | $-0.1304 \times 10^{-2}$ mm$^{-3}$ |
| $\alpha_3$ | $7.2502 \times 10^{-6}$ mm$^{-5}$ |
| $\alpha_4$ | $-8.3167 \times 10^{-7}$ mm$^{-7}$ |

TABLE 2

Optical Prescription for the Imaging Path

| Description | Radius (mm) | Material | Thickness (mm) | Notes |
|---|---|---|---|---|
| Eye Pupil | Infinity | Air | 25 | Eye Relief |
| Eye Lens 1st Surf | 13.2 | BK7 | 5 | Planoconvex Lens |
| Eye Lens 2nd Surf | Infinity | BK7 | 6 | Bonded to Prism |
| Mirror Surf | Infinity | BK7 | 25.44 | |
| Internal Image | Infinity | BK7 | 25 | End of Prism |
| Lens Air Space | Infinity | Air | 2 | Air Space |
| Relay Lens 1st Surface (Dual Use see Table 3) | 5.9 | BK7 | 4 | CV, Lens could be Plastic |
| Relay Lens 2nd Surface | 147.0562 at Vertex c=1/R | Air | 25.98 | CC, Asphere as per Table 1 |
| Display | Infinity | | | Cover glass omitted |

Note: User image at 609 mm.

TABLE 3

Optical Prescription for the Illumination Path

| Description | Radius (mm) | Material | Thickness (mm) | Notes |
|---|---|---|---|---|
| Illuminator and Air Space | Infinity | BK7 | 0.6 | Mount to Prism |
| Partial Reflection Surf | Infinity | BK7 | 6 | Polarization Beam Splitter |
| Internal Reflection | Infinity | BK7 | 6 | To End of Prism |
| Lens Air Space | Infinity | Air | 2 | Air Space |
| Collimator Lens 1st Surf. (Dual Use see Table 2) | 5.9 | BK7 | 4 | CV, Lens could be Plastic |
| Collimator Lens 2nd Surf. | 147.0562 at Vertex c=1/R | Air | 25.98 | CC, Asphere, Table 1 |
| Display | Inf | | | Cover glass omitted |

In these designs, reduced weight is attained by eliminating the need for a separate lens for collimating light from the LEDs. Referring to FIG. 4, it can be seen that by eliminating the collimating lens 50 (shown in FIG. 4), and the required distances associated with its focal length, a reduction in size and weight is attained.

Figure 7:
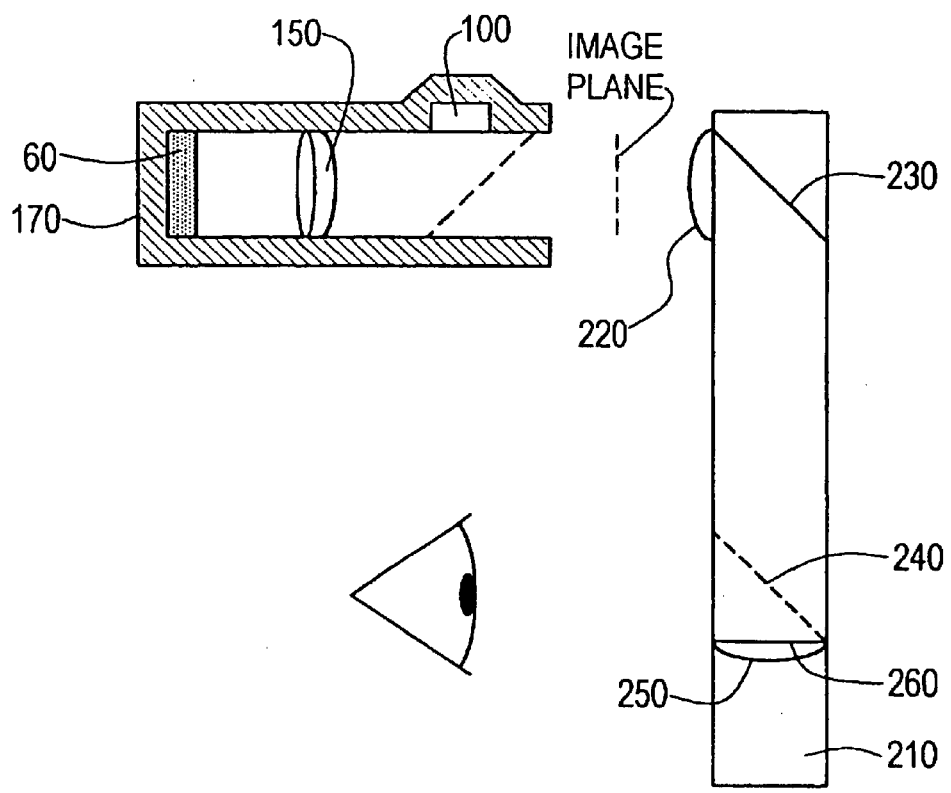
FIG. 7 is a schematic illustration of a display system according to the present invention in use with an eyeglass display.

FIG. 7 illustrates how the invention can be used in an eyeglass display of the type described in U.S. Pat. No. 5,886,822. A housing 170 for a reflective display 60 and magnifying lens system 150 is placed in proximity to an eyeglass lens 210. The display 60 is illuminated by a light source 100. Lens system 150 projects an image plane at the entrance pupil of the optical system in lens 210. Lens 210, with a magnifying internal optical relay formed by lens 220, polarization beam splitter 240, quarter wave plate 260, and concave mirror 250 provide an image to the eye of the user which is perceived as originating in front of the lens 210 at a comfortable distance.

In the foregoing discussion, we have referred to the image source as an LED or array of LEDs, since LEDs are a common light source in these displays. Many alternative illumination sources may be used, including lasers, or optical fiber delivering light from a remote source, or other lamps.

The use of sequential red, green, blue illumination in an eyeglass system of the type shown in FIG. 7 provides an image of excellent color. Sequential lighting of the LEDs however, reduces the duty cycle of the LEDs and therefore reduces the total amount of light provided to the eye. In systems of the type shown in FIG. 7, in which a beam splitter 240 is used as a combiner to fuse the ambient scene and the rays from the display, the viewer may require an unusually bright image, such as when in bright ambient sunlight.

Many applications such as the eyewear display previously cited require a color display for certain images, and a high brightness display for other images viewed in high ambient lighting, which may not need color. To make the sequential color display very bright, this invention also includes a method for implementing a high brightness monochrome mode, which involves powering the red, green, and blue LEDs simultaneously at up to 100% duty cycle.

Figure 8:
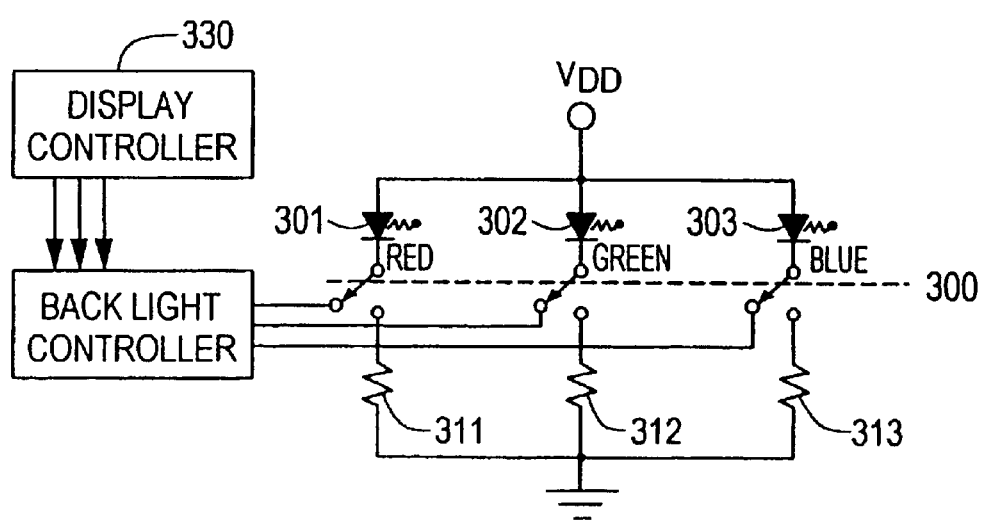
FIG. 8 is a block diagram and circuitry of an illumination control system according to the present invention.

In one embodiment of this invention shown in FIG. 8, the LEDs 301, 302, 303 are turned on continuously without any change to the frame rate of the AMLCD using switch 300. Continuous and simultaneous illumination of all three LEDs results in the portrayal of the image as black and white, and with the white being much brighter than any color that would be developed from sequential LED flashes of red, green, and blue.

Figure 1:
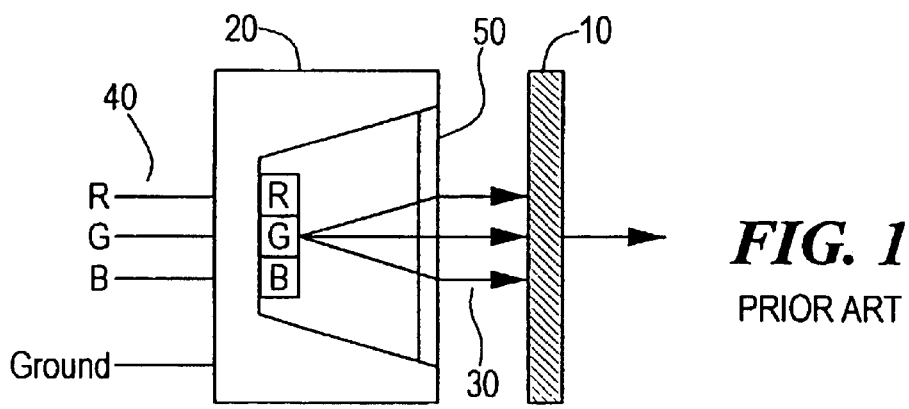
FIG. 1 is a schematic illustration of a prior art transmissive active matrix liquid crystal display illumination system.

Simultaneous illumination can be attained by employing a switch 300, as shown in FIG. 8 applied to the illuminator power circuit. In one position of the switch, the LEDs are connected to the sequential color drive circuit in the backlight controller. In the other position, the LEDs are connected to a current source. FIG. 8 shows the current source comprising VDD, the LEDs 301, 302, 303, current-limiting series resistors 311, 312, 313, and ground; however, other circuits may be used to provide current to the LEDs. The switch 300 provides current to the LEDs continuously and simultaneously, so that at least triple the duty cycle for each LED is obtained. The technique may be applied to transmissive AMLCD illuminators (FIG. 1) or to reflective AMLCD illuminators (FIG. 2).

Figure 9:
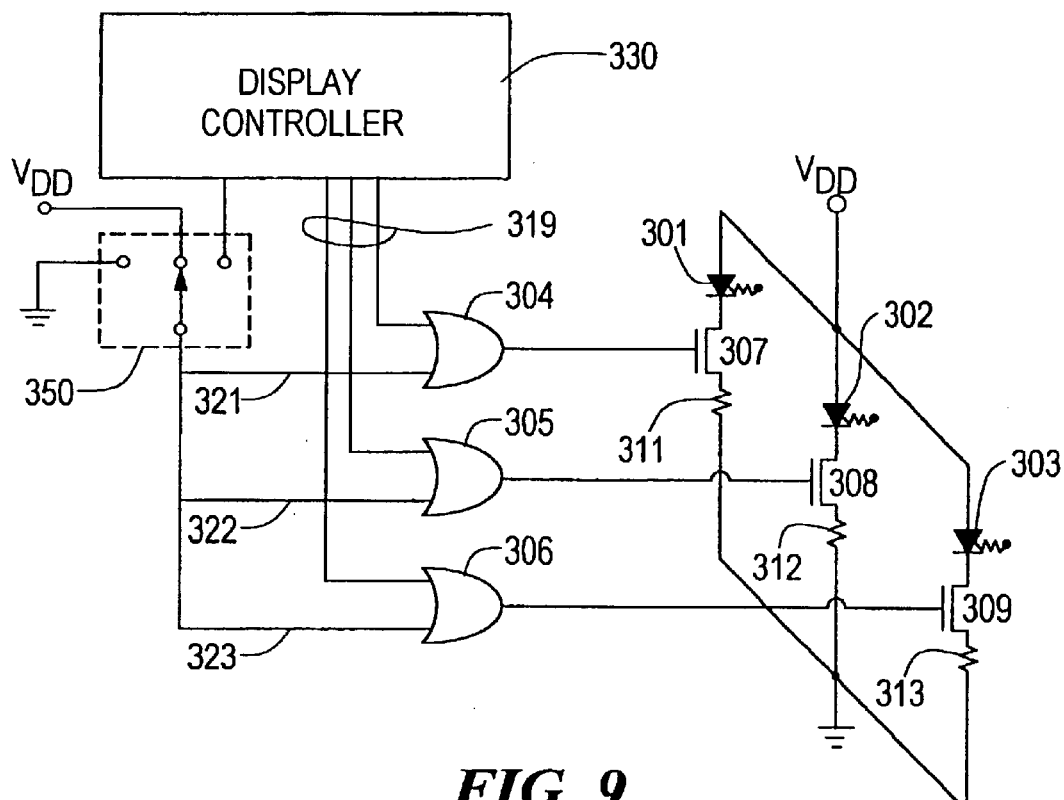
FIG. 9 is a block diagram and circuitry of a further embodiment of an illumination control system according to the present invention.

An alternative embodiment is shown in FIG. 9. A switch 350 is used to provide a logic input to the display controller 330 to control the LEDs. The display controller 330 supplies illumination signals along paths 319 to the LEDs through OR gates 304, 305 and 306. Logic output from the OR gates is applied to the gates of the control transistors 307, 308, 309 which enables current to flow through the LEDs in correspondence with the logic signal supplied on the paths 319. The switch 350 is used to select the operating mode of the illuminator. In the left position (ground), the inputs of the OR gates are held to ground, allowing the control signals on paths 319 to have full authority over the control of the LEDs. In the center position, the OR gate inputs 321, 322, and 323 are held at VDD meaning that the output of the OR gates is held high, and the LEDs are consequently continuously illuminated, regardless of the signals on paths 319. If switch 350 is in the far right position, the lines 321, 322, 323 are held at a value established by the logic within the display controller, or by an alternative logic path (not shown) from another control circuit.

Figure 10:
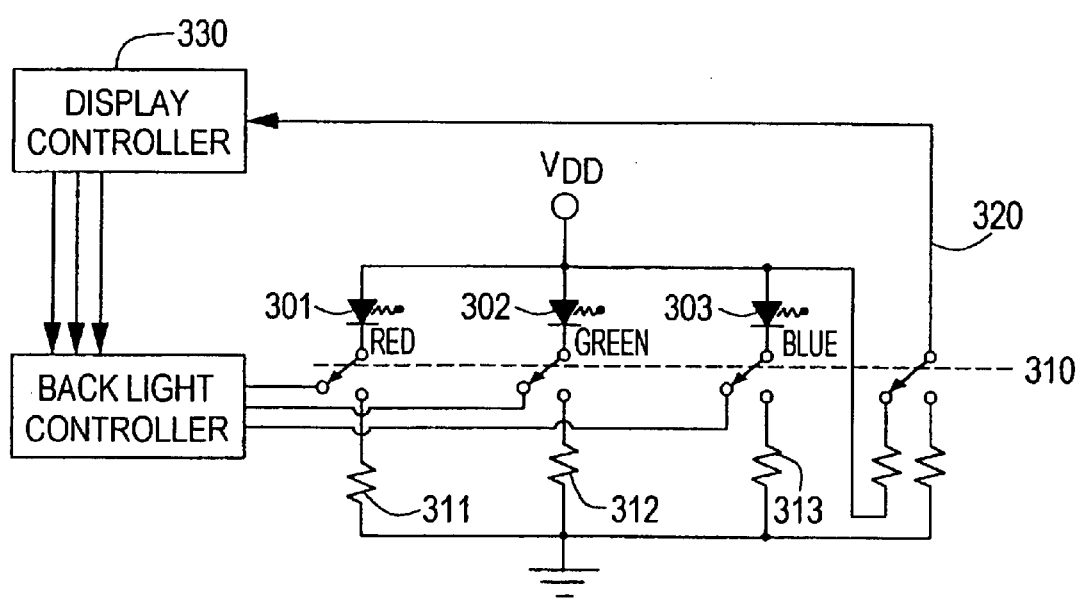
FIG. 10 is a block diagram and circuitry of a still further embodiment of an illumination control system according to the present invention.

A third embodiment (FIG. 10) comprises a switch 310 that also provides a logic signal path 320 to the AMLCD display controller. The logic signal on line 320 signifies the selection by the user of the high brightness monochrome mode. This signal enables the controller logic to reduce power consumption in memory and elsewhere and to adjust the signal to use the optimal balance of red, green, and blue information from which to construct a monochrome image.

A further improvement to this invention comprises a circuit that allows the microprocessor to select the background color. Ordinarily, by running red, green, and blue LEDs at full brightness, one obtains a high brightness black and white display, as previously described. By controlling the balance of current among the three LEDs, any backlight color may be attained. Black and white may be used as the primary high brightness illumination, but if the application running on the computer so selects, the background color can be switched to, for example, red to indicate a warning in black and red. This is obtained by powering only the red LED.

Figure 11:
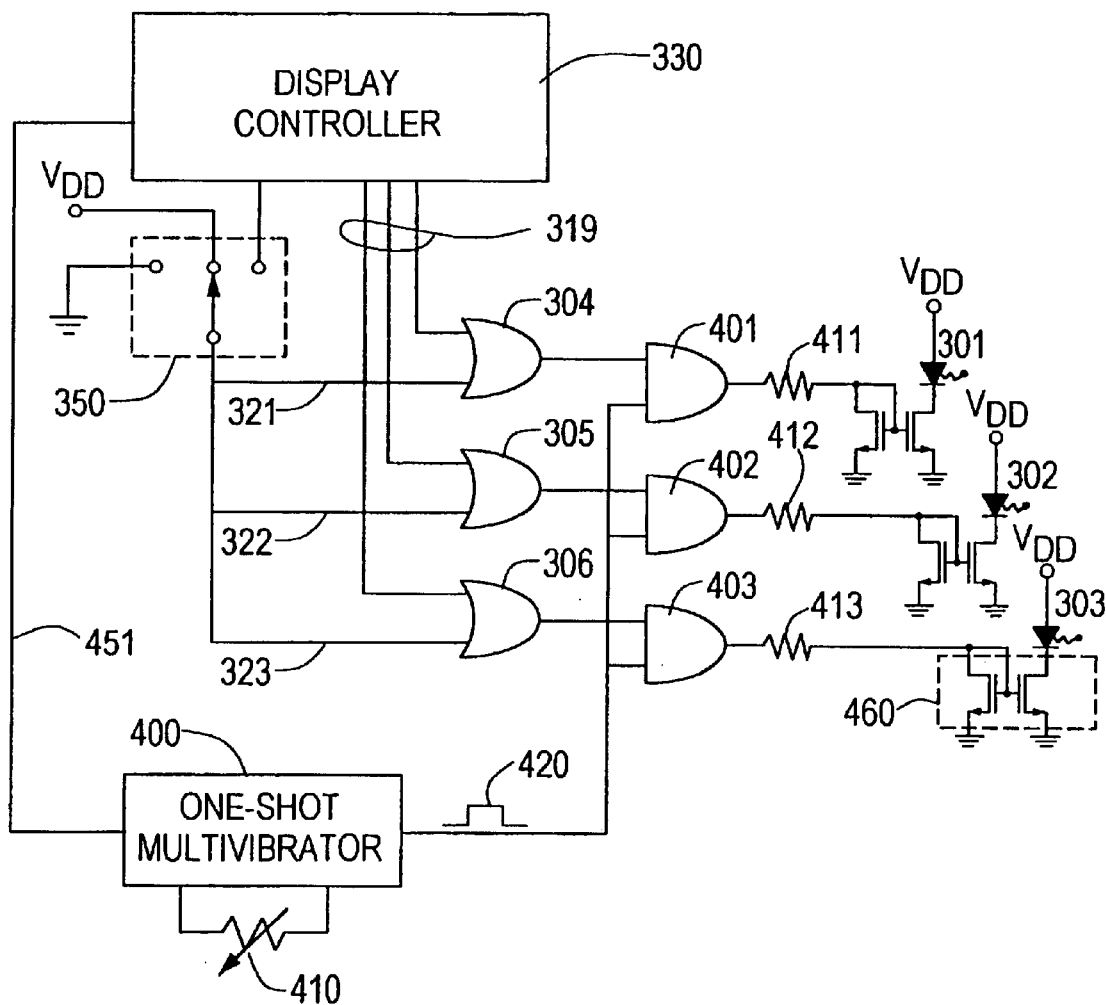
FIG. 11 is a block diagram and circuitry of a still further embodiment of an illumination control system according to the present invention.

Note that the LEDs do not have to be illuminated continuously in monochrome mode, or for their full duty cycle in color mode. The logic devices described above can be used to provide reduced duty cycles to affect reduced brightness in either monochrome or color mode. FIG. 12 shows a diagram of how such brightness control can be attained. The signal to illuminate one of the LEDs originates at the display controller 330. A pulse is provided simultaneously to a one shot multivibrator 400 by path 451. The signal to illuminate LED 303, for example, passes from the display controller 330 through the OR gate 306 and is passed to an AND gate 403. The AND gate passes the illumination signal only for the time that the pulse 420 is present. This pulse 420 is initiated by multivibrator 400 upon receipt of the initiating pulse from line 451. The duration of the pulse is controlled by the setting of the potentiometer 410, under the control of the user of the system. If the pulse width time is t, the corresponding AND gate is held open for a corresponding time, t, and the LED is illuminated for the time t. Thus, the width of the pulse from multivibrator 400 exerts control over the duty cycle of the LEDs and hence brightness. FIG. 11 shows that the signal from the AND gate passes through a series resistor 413 which controls the current through the matched pair of field effect transistors 460. Note that the pulse width, t, may also be controlled by logic signals that can be applied by the display controller, or that can be applied to the one-shot multivibrator through an additional logic path (not shown).

The illumination circuits shown in FIGS. 8 through 12 may be implemented in discrete logic devices, in a programmable logic device, or in a custom integrated circuit. Alternatively, the circuits may also be integrated within the display controller. The circuits may be configured to control alternative illumination sources such as laser diodes.

The invention is not to be limited by what has been particularly shown and described, except as indicated by the appended claims.

What is claimed is:

1. A display illumination and viewing system comprising:

an illumination optical path and a viewing optical path, at least a portion of the illumination optical path coinciding with at least a portion of the viewing optical path to form a coinciding path portion;

a display comprising an active matrix liquid crystal display located at one end of the coinciding path portion;

a first lens system located on the coinciding path portion and having a first focal length, the first lens system providing an image plane on the viewing optical path;

a second lens system located on the viewing optical path;

an illumination assembly located on the illumination optical path and off the coinciding path portion, the illumination assembly spaced from the first lens system by a same length as the first focal length of the first lens system; and a reflective and transmissive element located at an opposite end of the coinciding path portion to reflect light from the illumination assembly onto the coinciding path portion toward the display and to transmit light from the display along the viewing optical path.

2. The display illumination and viewing system of claim 1, wherein the illumination assembly comprises red, green, and blue light emitting diodes.

3. The display illumination and viewing system of claim 1, wherein the illumination assembly comprises red, green, and blue laser diodes.

4. The display illumination and viewing system of claim 1, further comprising a further optical element on the illumination optical path.

5. The display illumination and viewing system of claim 4, wherein the further optical element comprises a diffuser.

6. The display illumination and viewing system of claim 1, wherein the reflective and transmissive element comprises a beam splitter.

7. The display illumination and viewing system of claim 6, wherein the beam splitter comprises a polarization beam splitter.

8. The display illumination and viewing system of claim 6, wherein the beam splitter comprises thin film multilayers or a thin film metal layer or a half silvered mirror or a beam splitting cube.

9. The display illumination and viewing system of claim 1, further comprising a housing, the display, the first lens system, the illumination assembly, and the reflective and transmissive element supported within the housing.

10. An eyewear assembly comprising:

a head-mountable frame;

an eyewear lens supported by the frame in front of a user's eye; and the display illumination and viewing system of claim 1 disposed to transmit light along the viewing optical path into an optical path through the lens.

11. The eyewear assembly of claim 10, further comprising a housing supported on the head-mountable frame, the display, the first lens system, the illumination assembly, and the reflective and transmissive element supported by the housing; and wherein the second lens system is affixed to the eyewear lens.

* * * * *

UNITED STATES PATENT AND TRADEMARK OFFICE
CERTIFICATE OF CORRECTION

PATENT NO. : 6,724,354 B1 Page 1 of 1
DATED : April 20, 2004
INVENTOR(S) : Mark B. Spitzer et al.

It is certified that error appears in the above-identified patent and that said Letters Patent is hereby corrected as shown below:

Column 6,
Lines 28 and 49, "VDD" should read -- $V_{DD}$ --.

Signed and Sealed this

Third Day of January, 2006

JON W. DUDAS
*Director of the United States Patent and Trademark Office*